United States Patent [19]
Botkin

[11] Patent Number: 5,492,228
[45] Date of Patent: Feb. 20, 1996

[54] FREE STANDING ATHLETIC EQUIPMENT RACK

[76] Inventor: Terry Botkin, 10355 Dover St., #1234, Westminister, Colo. 80021

[21] Appl. No.: 253,708

[22] Filed: Jun. 3, 1994

[51] Int. Cl.⁶ .................................................... A47F 5/00
[52] U.S. Cl. ............................ 211/13; 211/22; 211/70.5; 211/205; 211/207; 248/309.1
[58] Field of Search ................................ 211/13, 17, 18, 211/20, 22, 24, 189, 198, 205, 207; 248/309.1, 176

[56] References Cited

U.S. PATENT DOCUMENTS

| | | |
|---|---|---|
| 610,656 | 9/1898 | Martin . |
| 615,995 | 12/1898 | Leonard .................................. 211/22 |
| 774,995 | 11/1904 | Speir . |
| 1,667,669 | 4/1928 | Megee ..................................... 211/24 |
| 3,710,734 | 1/1973 | Bofferding et al. .................... 108/108 |
| 3,879,027 | 4/1975 | Thurmond, Jr. ........................ 269/157 |
| 3,964,611 | 6/1976 | Galen et al. ................................ 211/5 |
| 3,976,200 | 8/1976 | Munns ..................................... 211/18 |
| 4,116,341 | 9/1978 | Hebda ..................................... 211/17 |
| 4,552,270 | 11/1985 | Lentz et al. ............................. 211/17 |
| 4,754,841 | 7/1988 | Koffski ..................................... 182/92 |
| 4,813,550 | 3/1989 | Saeks ...................................... 211/17 |
| 5,044,505 | 9/1991 | Spratt ...................................... 211/22 |
| 5,082,120 | 1/1992 | Vega ....................................... 211/20 |
| 5,083,729 | 1/1992 | Saeks et al. ............................. 211/22 |
| 5,086,930 | 2/1992 | Saeks ...................................... 211/17 |
| 5,294,006 | 3/1994 | Deschino ................................. 211/18 |

OTHER PUBLICATIONS

Advertisement brochure of Ultimate Support Systems, Inc., 2506 Zurich Drive, P. O. Box 470, Fort Collins, Colorado 80522; Models shown—VC–20B Two Bike Storage Column and VC–40B Four Storage Column.

*Primary Examiner*—Robert W. Gibson, Jr.
*Attorney, Agent, or Firm*—Novak Druce Herrmann Burt

[57] ABSTRACT

Self supporting rack for athletic and sports equipment. The rack has a vertical center post with a base support at a bottom end of the pole. An upper end of the center post is unsupported. Equipment support assemblies are mounted upon the center post and are upon which athletic and sporting equipment is stored. The length of the support assemblies may be varied in order to stagger the stored items. The connection of the support assembly to the center post allows the support to be positioned anywhere along the length of the pole. The connection allows the assemblies to be extended from any exterior surface of the center post. The arms of the support assembly are also maintained in a substantially horizontal orientation by the connection when in use.

13 Claims, 5 Drawing Sheets

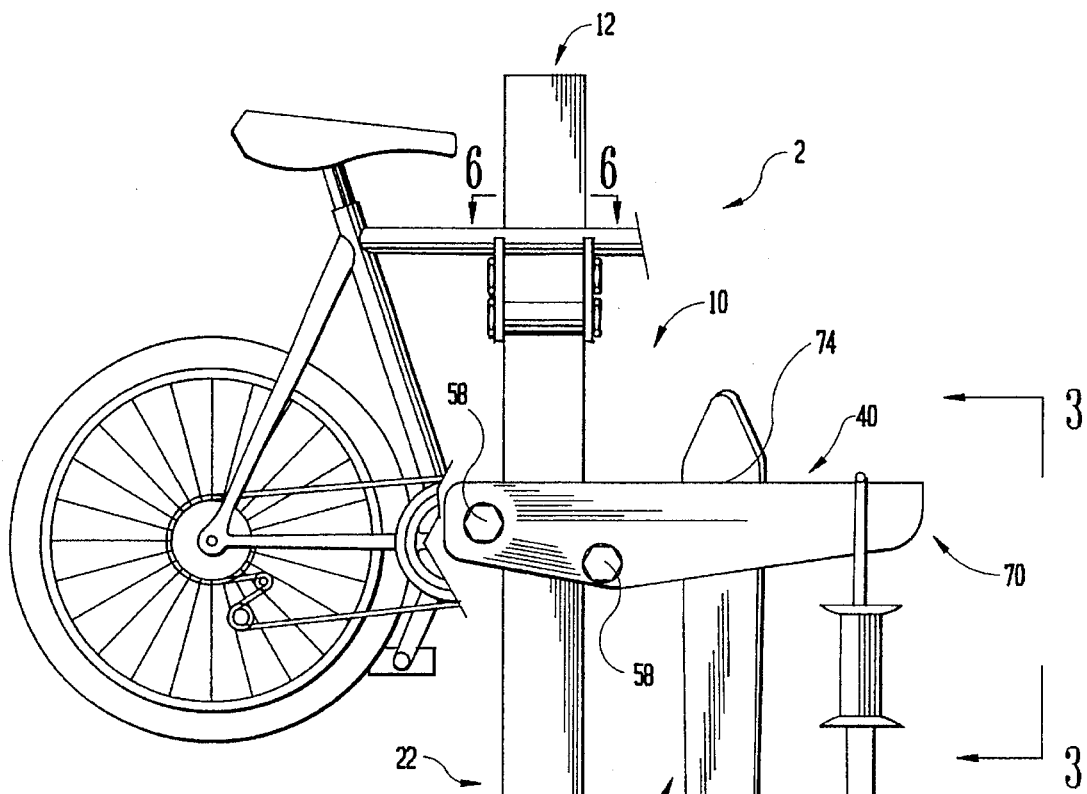
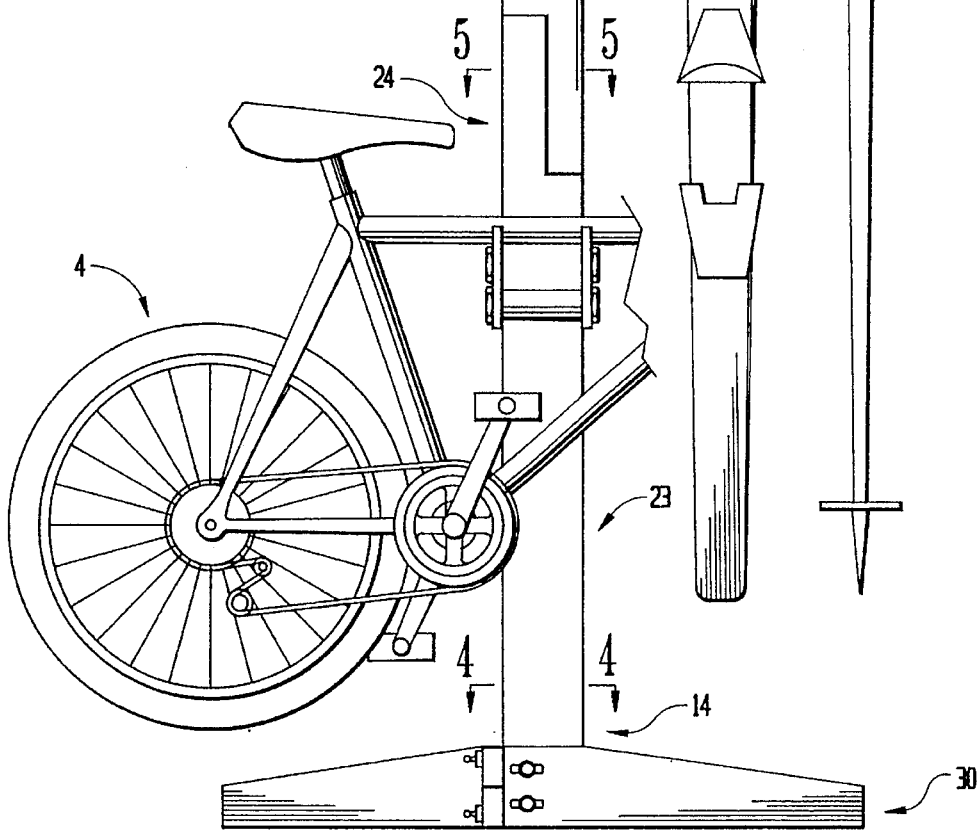
FIG-2

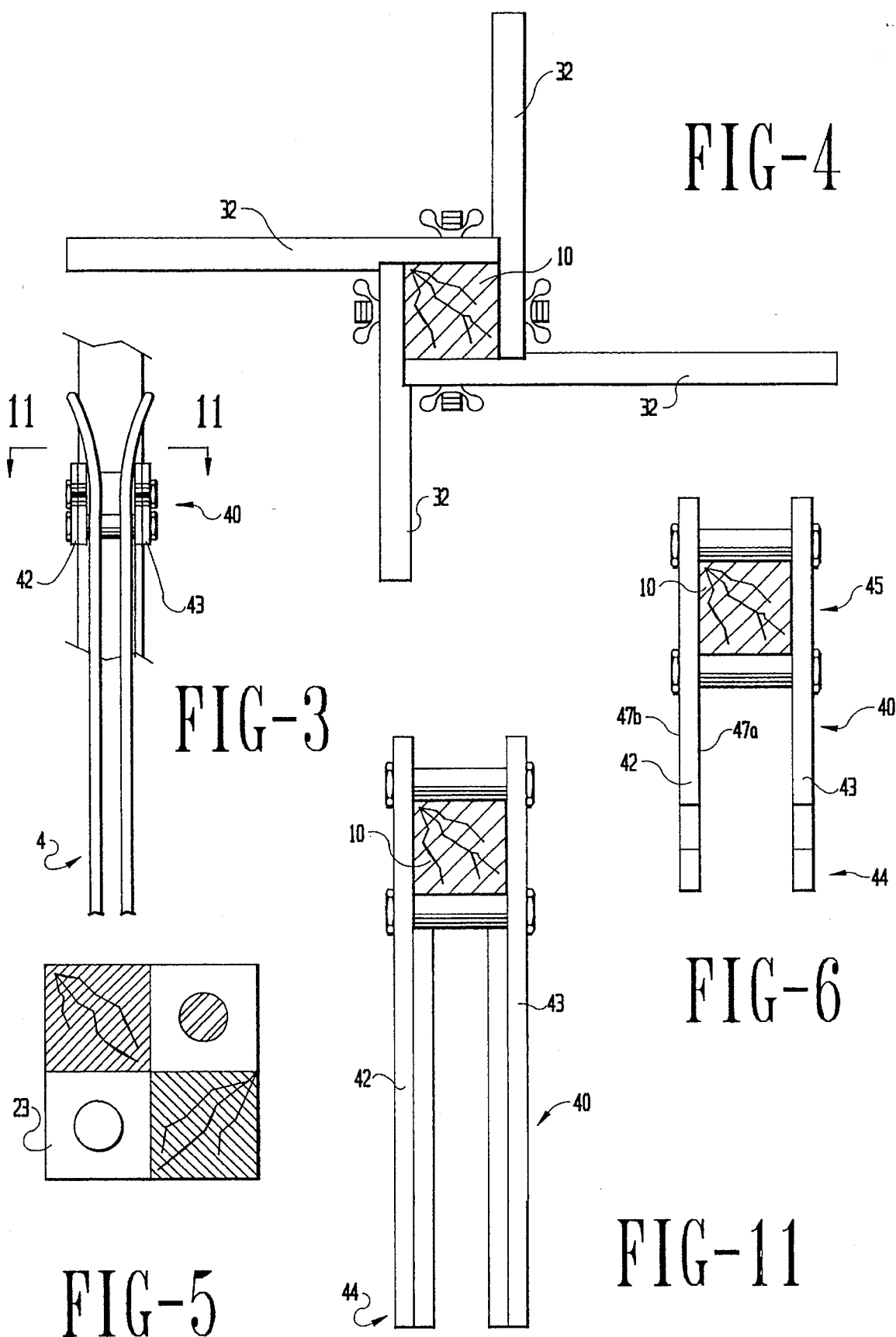

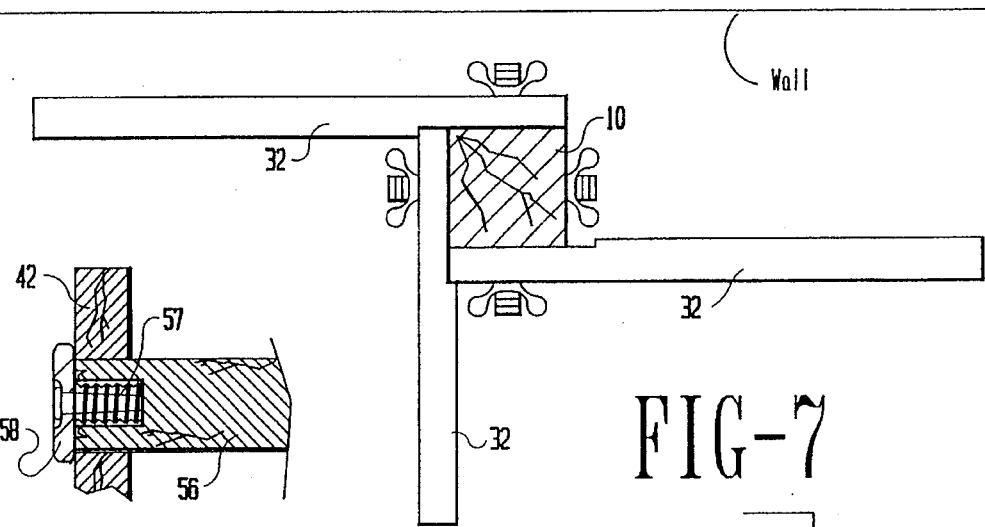
FIG-7
FIG-9
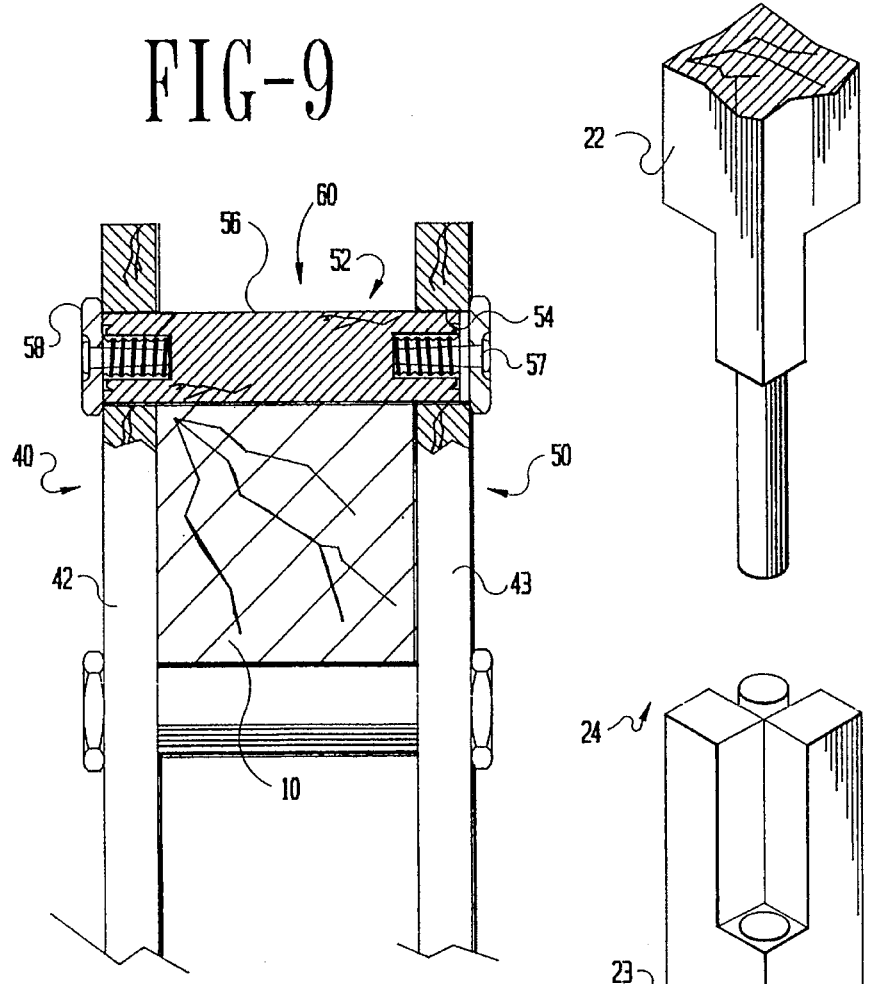
FIG-8
FIG-10

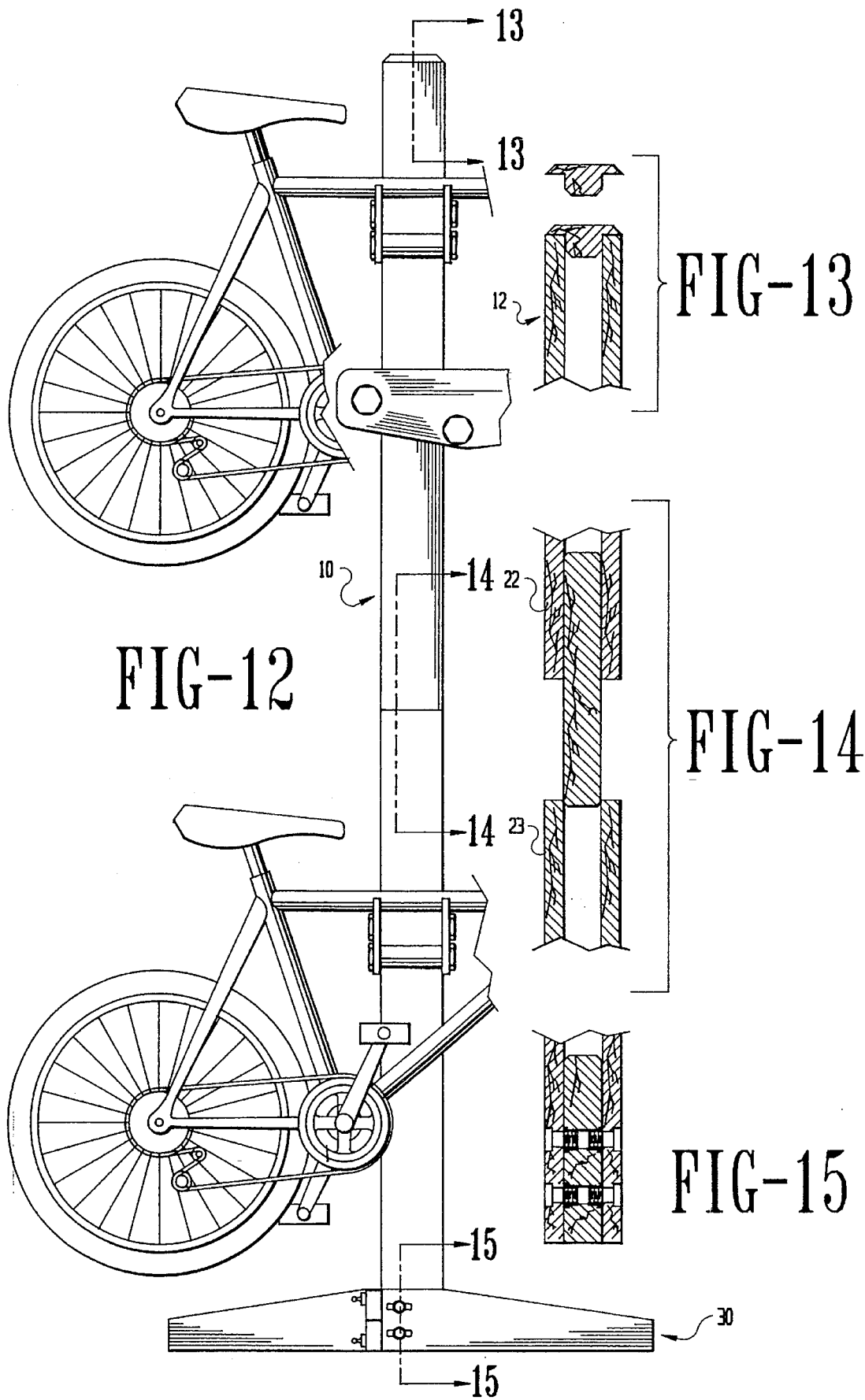

FREE STANDING ATHLETIC EQUIPMENT RACK

FIELD OF THE INVENTION

This invention pertains to athletic equipment storage means, and more particularly to free standing racks that are used to hang athletic and sporting equipment when the equipment is not in use.

BACKGROUND OF THE INVENTION

Athletic and sporting equipment must usually be stored since it is only utilized during the limited time periods when a user is undertaking a specific activity in which the equipment is applicable. As a result, it has been long recognized that space efficient storage of this type of athletic and sport equipment is desirable.

U.S. Pat. No. 610,656 entitled Bicycle Hanger to Martin discloses a wall mounted embodiment of a bicycle rack. To mount the Martin hanger, however, a supporting wall must be defaced. Furthermore, the weight that the rack can support is limited by the wall's construction characteristics.

Several multi-columned racks are also known. They include U.S. Pat. No. 5,044,505 entitled Equipment Storage Frame to Spratt. Multi-columned racks have the desirable feature of having the equipment stably suspended between the columns, but also the undesirable feature of taking up more space than a single columned rack.

Another popular means for supporting equipment is through the use of a member(s) suspended between a floor and ceiling as illustrated in U.S. Pat. No. 5,086,930 entitled Storage System for Holding Athletic Equipment and Method. A common draw back to these types of suspension methods and apparatus is that a suitable location must be available in which an appropriately spaced floor and ceiling are present. Furthermore, since this type of rack will not support itself, it is more difficult to move when loaded. In view of these comments and the disclosure made herein, the need for a single columned rack that is self supporting is illustrated.

SUMMARY OF THE INVENTION

This invention finds application in the storage of most athletic and sporting equipment, but there is specific application in the storage of large pieces of equipment such as bicycles and ski equipment which are of a particularly large size. A single column or center post rack is provided that rests upon a legged base. The rack is free standing and is not limited to covered areas of storage since support at the top end of the center post is not required. In the illustrated embodiment, the rack is constructed from readily available commercial lumber stocks. The primary support components are made from wood and include the center post, the legs of the base support, and the equipment support assemblies upon which the equipment actually rests. While the illustrated embodiments are constructed from wood, it is contemplated that other suitable construction materials may also be employed. It is anticipated that appropriate construction materials include plastics, composites, and metals, among others.

The preferred embodiment utilizes a center post that is square in cross-section. Therefore, the equipment support assemblies, as well as the legs of the support base may be easily extended from the four faces of the post at ninety degree intervals.

A high degree of versatility is provided in the storage capacity of the invention in several ways. The horizontal extension lengths of the equipment support assemblies are varied. In this way, different pieces of equipment may be hung upon the center post, but at different distances away from the post. This allows the items being hung to be staggered and overlapped with respect to the vertical length of the center post. Variability in support assembly length is accomplished by exchanging and ordering a plurality of support assemblies.

Versatility is further enhanced by the ability of the user to locate one or more equipment support assemblies at any position along the length of the center post. In this way, adjustments may be made to achieve dense storage. As many, or as few support assemblies may be used at any one time as will fit upon the length of the center post and accommodate the equipment needing to be stored.

The invention provides the ability to extend hanging support assemblies at any surface of the center post. Therefore, staggering to achieve a denser pack may also be accomplished by placing objects at all sides of the center post.

In one embodiment, a free standing athletic equipment rack is disclosed. The rack has a single upright center post that has a top end, a bottom end, a substantially vertical centerline, and a length located along the centerline and measured between the top end and the bottom end. There is a base connected to the bottom end of the center post for maintaining the center post in an upright position. An equipment support assembly is selectively positionable at any location along the center post's length. The equipment support assembly has a length and is substantially horizontally oriented. The equipment support assembly has a first arm and a second arm; one arm is located opposite the other arm and each arm is astride the center post and at opposite sides of the center post. There is a connection means between the first arm and the second arm for urging the two arms toward one another and into frictional engagement with the center post positioned therebetween. A restraining means for maintaining the equipment support assembly in substantially horizontal orientation is also provided. A carrying means for receiving articles of athletic equipment and securing those articles therein is provided upon the equipment support assembly.

The equipment support assembly has a distal end located away from the center post and a supported end connected to the center post in cantilevered orientation thereto.

Each arm likewise has a distal end located away from the center post and a supported end located at the center post and adjacent thereto. Each arm also has an interior face for abutting engagement with the center post.

The connection means has tightenable supports connected through apertures in the arms and spanning a distance between the arms.

The tightenable supports include dow rods connected between the arms, screws extending through the apertures and into ends of the dow rods, and knobs located exteriorly to the arms for advancing the screws into the dow rods thereby drawing the arms inwardly, one toward the other.

The restraining means also encompasses the apertures and the dow rods. The apertures and dow rods are vertically and horizontally offset from one another and positioned on opposite sides of the center post for abutting engagement therewith. In this manner the equipment support assembly is maintained in a substantially horizontal orientation therewith.

In the preferred embodiment, the knobs have a minimum diameter of about one and one-half inches and a minimum thickness of about one-quarter inch.

The carrying means includes aligned recesses in the top surfaces of the arms. The recesses are configured to mate with a supportable member of the article of athletic equipment. The recesses are located proximate to a distal end of the equipment support assembly away from the center post.

The aligned recesses have the shape of half circles for receiving the tubular frame of a bicycle.

It is contemplated that there will be a plurality of equipment support assemblies mounted upon the center post and at least one of those equipment support assemblies will have a longitudinal length different from the longitudinal lengths of the other equipment support assemblies. This allows athletic equipment supported upon the rack to be staggered at various distances from the center post.

The plurality of equipment support assemblies are mounted upon the center post so that at least one of the equipment support assemblies extends away from the center post in a different direction from the other equipment support assemblies thereby allowing athletic equipment supported upon the rack to be positioned on variable sides of the center post.

The top end of the center post is unsupported.

The center post is cross-sectionally rectangular in shape thereby providing four exterior longitudinal sides.

The base includes at least three legs projecting outwardly away from the center post. Each leg extends from a different exterior longitudinal side of the center post.

In the preferred embodiment, the center post is constructed from a continuous wooden post having a square cross-sectional shape.

BRIEF DESCRIPTION OF THE DRAWINGS

FIG. 2 is a front view in partial cut-away of a sectioned center post showing two bicycles and a set of snow skis and poles supported thereon.

FIG. 3 is a side view of an equipment support assembly with a pair of ski's installed.

FIG. 4 is a partial sectional view showing a four legged base connected to the center post.

FIG. 5 is a sectional view showing the interconnecting joint between two sections of the sectioned center post.

FIG. 6 is a sectional view showing the equipment support assembly appropriate for supporting a bicycle.

FIG. 7 is a sectional view showing a three legged base connected to the center post and adjacent to a wall.

FIG. 8 is a partial cut-away showing details of the connection means for an equipment support assembly, FIG. 9 is a partial cut-away showing details of the tightenable supports for an equipment support assembly.

FIG. 10 is a perspective view of the connection between the two sections of the center post.

FIG. 11 is a partial sectional view showing the support for a pair of snow skis in which inserts have been placed between the arms to decrease the space therebetween and increase the strength of the support assembly.

FIG. 12 shows an alternative embodiment in which a hollowed center post is utilized.

FIG. 13 shows a cross-sectional view of an upper capped end of the center post.

FIG. 14 shows a cross-sectional view of the interconnecting joint of the upper and lower sections of the center post.

FIG. 15 shows a cross-sectional view of a connection means between the legs and the tubular center post.

DESCRIPTION OF THE PREFERRED EMBODIMENT

Figure 1:
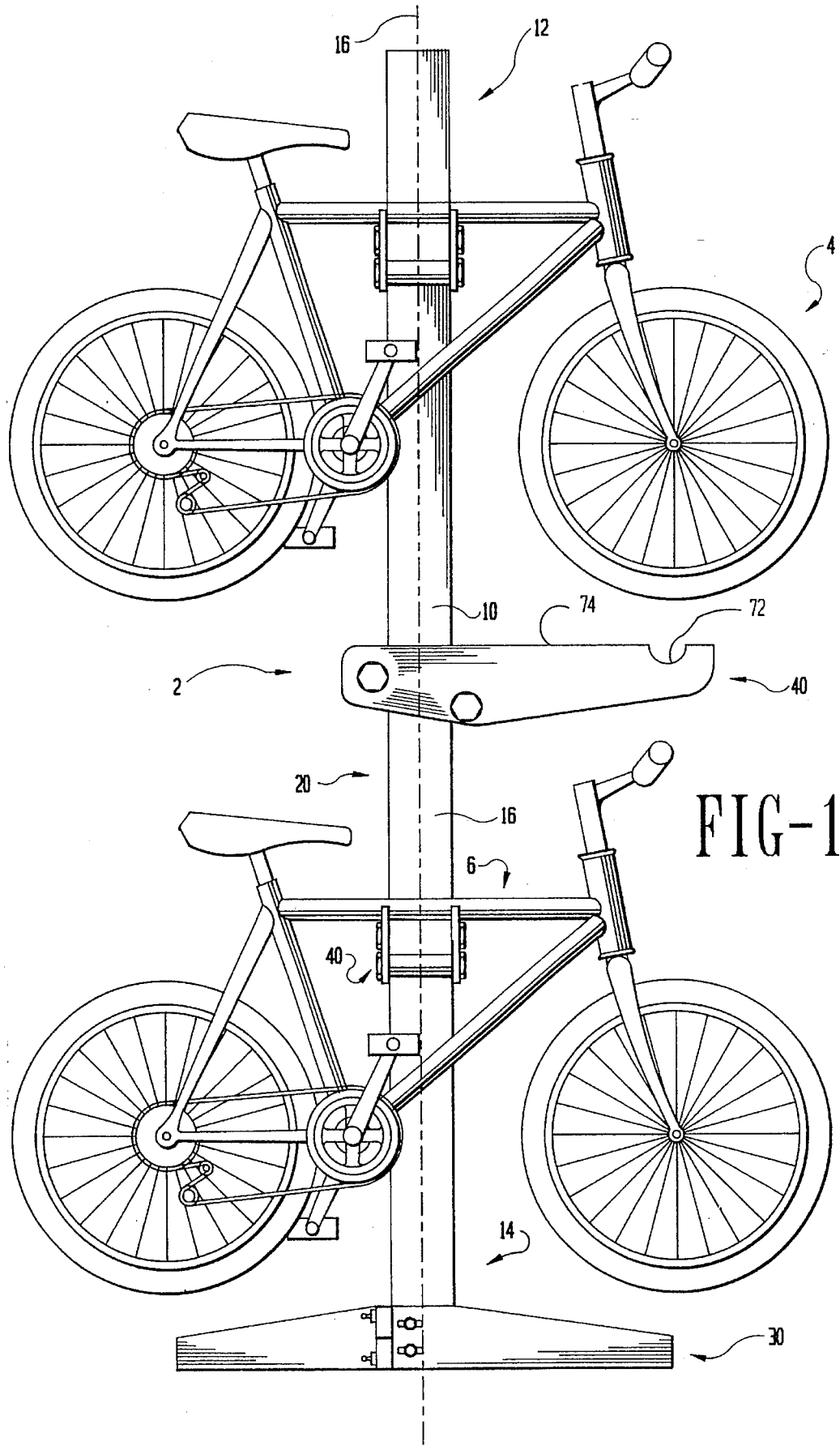
FIG. 1 is a front view of the free standing athletic equipment rack showing a continuous center post and two bicycles mounted thereupon.

Referring to FIG. 1, free standing athletic equipment rack 02 is illustrated. As shown, a bicycle is a representative piece of athletic equipment 04 in which a top frame member of the bicycle serves as a supportable member 06 of the piece of equipment 04.

The equipment rack 02 comprises three primary components: an upright center post 10, a base 30 located at a bottom end 14 of the center post 10, and a plurality of equipment support assemblies 40 that are positioned upon a length of the center post 10. As may be appreciated from the illustration of FIG. 1, equipment support assemblies 40 may extend at any exterior longitudinal side 20 of the center post 10. As shown, the support assemblies 40 that carry the bicycles extend outwardly while a middle support assembly 40 extends to the right and is shown empty.

The center post 10 has a top end 12 which is opposite the bottom end 14. In the preferred embodiment, the center post 10 is in a substantially upright position so that a longitudinal centerline 16 of the post 10 is substantially vertical. The length of the center post 10 is measured along the centerline 16 between the top end 12 and the bottom 14. As shown, the base 30 rests upon the ground and top end 12 of the post 10 projects upwardly directly thereabove without additional support.

FIG. 2 shows an alternative embodiment of equipment rack 02 in which the center post 10 comprises two sections. There is an upper section 22 and a lower section 23 which are joined together in fixed relative relationship by interconnecting joint 24. As illustrated in FIG. 2, multiple types of equipment 04 may be supported upon the equipment support assembly 40 at any one time. In this case, a set of snow skies and poles are shown, together with the bicycles. This configuration is particularly suitable because the snow skies and poles oriented in the illustrated fashion are easily placed between bicycles located on opposite sides of the center post 10. Referring now to FIGS. 6, 8, and 11, embodiments of the equipment support assembly 40 may be seen. In each case, a first arm 42 and a second arm 43 are shown. Each arm has an interior face 47a and an exterior face 47b opposingly oriented thereto. Each arm 42 and 43 has a supported end 45 which is located approximate to the center post 10 and a distal end 44 which is located distally and away from the center post 10 and opposite to the supported end 45.

The support assembly 40 is connected to the center post 10 by connection means 50. Portions of the two arms 42 and 43 in conjunction with dow rods 56, screws 57 and knobs 58 cooperate to form a tightenable support 52 for the assembly 40. As may be seen in the illustrated figures, the connection means 50 is used to draw the first and second arms of the support assembly 40 inwardly toward one another and into pressing engagement with exterior sides 20 of the center post 10. In this way, the minimum distance or clearance between the arms 42 and 43 is equal to the width of the center post 10. The dow rods 56 are constructed from wood in the illustrated embodiments. The rods 56 may be either hollow tubulars, or they may be solid cylinders. In any event, anchor nuts are inserted or screwed into ends of the rods 56 and secured therein. Securement of the nuts in the rods 56 is accomplished by an exterior set of threads that surround the exterior surface of the nut. When inserted into the dow rod 56, the outer threads bite into the wood and form a friction connection therewith just as would a screw. The interior surface of the nut is threaded and sized to screwingly engage threads of the screws 57. In the illustrated embodiment, the dow rods 56 have a outer diameter of approximately one inch. When assembled, ends of the dow rods 56 must partially extend into the apertures 54 that protrude through the arms 42 and 43. Therefore, the interior diameter of the apertures is just slightly larger than one inch. This allows ends of the rods 56 to project into the apertures 54, but provides a close fit between the rod 56 ends and the apertures 54. By allowing the dow rods 56 to extend into the apertures 54, the loads transmitted therebetween may be distributed to the abutting surfaces of the exterior of the rod 56 and interior surface of the aperture 54. This provides greater strength to the support assembly 40 than would be provided by merely having the screws 57 projecting through the apertures 54, The length of the rods 56 is such that it is just less than the width of the center post, together with the combined widths of the arms 42 and 43. By inserting the screws 57 through apertures 54 in the arms 42 and 43, a tightening effect is achieved when the knobs 58 to which the screws 57 are connected are manually turned by a user. In the described configuration, the knobs 58 will tighten flush up against The exterior face 47b of the arms 42 and 43, but will not abut the ends of the dow rods 56.

As may most clearly be seen in FIGS. 2 and 8, the dow rods 56, when appropriately installed and with the knobs 58 sufficiently tightened, act as restraining means 60. Restraining means 60 places the connection 50 in a bind upon the post 10 when a piece of equipment 04 is positioned at the distal end 44 of the support assembly 40. The restraining means 60 also acts as an anchor for maintaining the support assembly 40 in its horizontal and perpendicular orientation with respect to the center post 10. This feature may be most readily appreciated in FIG. 2 where the knobs 58 are shown to be both horizontally and vertically offset. When loaded as shown, the support assembly 40 carrying the ski equipment causes the left most dow rod 56 to push against the left exterior longitudinal side 20 of the center post 10 and the right most dow rod 56 to press against the right longitudinal side 20 of the center post 10. In this way, the bind is created upon the connection 50 as described above. The more weight that is applied to the distal end 44 of the equipment support assembly 40, the greater the bind becomes and the more surely the assembly 40 is fixed along the length of the post 10. Once the bind is created, it will continue until the position of the support assembly 40 is upset. After the bind is relieved, then The support assembly 40 may be moved along the length of the center post 10. This configuration and above described action of the connection means 50 and restraining means 60 is commonly known as a cantilevered effect and orientation.

The illustration of FIG. 9 shows a knob 58 with the screw 57 extending through apertures of the arm 42. This may be seen as an alternative to having the dow rods 56 partially extend into the apertures 54.

FIGS. 4 and 7 illustrate embodiments of the base 30 which balances and maintains the center post 10 in an upright orientation. The embodiment of FIG. 4 shows four legs 32 connected to the center post 10 by winged nuts or bolts that extend through apertures in the legs 32 and into the center post 10 or tightenable securement therewith. FIG. 7 shows a three legged configuration that is suitable for placement adjacent to a wall where a leg 32 projecting toward the wall would cause the rack 02 to extend away from the wall to an undesirable degree. In each embodiment, the legs 32 project outwardly along a longitudinal side 20 of the center post 10. Therefor, when the center post 10 is of a square cross section as shown in the illustrations, the legs 32 would be oriented at 90 degree intervals and consecutive legs 32 about the center post 10 will be perpendicularly oriented with respect to longitudinal center lines of the legs 32.

Referring once again to FIGS. 1 and 2, carrying means 70 located upon distal end 44 of the equipment support assembly 40 may be seen. In the preferred embodiment and that illustrated throughout the figures, the carrying means 70 comprises aligned recesses 72 that are cut into top surfaces 74 of the arms 42 and 43. As shown in FIG. 1, the recesses 72 take the form of half circle indentations into the arms 42 and 43. The recesses 72 are particularly suitable for receiving a tubular support of a bicycle or a bicycle wheel. A restraining means may be optionally associated with the carrying means 70 for securing the athletic equipment 04 into the receiving recesses 72.

Referring to FIGS. 5 and 10, the interconnecting joint 24 between the upper and lower sections 22 and 23 of an optionally sectioned center post 10 are illustrated. As may be seen in these illustrations, a dow-in-hole configuration is shown. In this way, the upper and lower sections 22 and 23 may be releasably connected, one to the other, in relative fixed orientation. Because the load carried by the center post 10 will be almost exclusively in compression, it is preferred that the interconnecting joint be configured as illustrated. This facilitates both the connection together of the sections, as well as release and disassembly of the sections when not in use. The abutting surfaces of the rectangularly projecting surfaces of the joint 24 meet in face-to-face abutment and become fixed with respect to the vertical. When the dow rods are inserted within their respective holes, relative movement in the horizontal is also prevented.

An alternative embodiment of the invention is illustrated in FIGS. 12–15. Therein, a hollow or tubular center post 10 is utilized which has a top cap as shown in FIG. 12. An interconnecting joint 24 is provided as illustrated in FIG. 14 with the piston type dow inserted within a tubular interior of an upper section 22 and lower section 23 of the center post 10. A manner of preferred construction calls for the permanent location of the piston within the interior of one of the sections 22 or 23 so that a distal end of the piston extends therefrom. The distal end may then be inserted into the tubular interior of the other section for affecting the connection therebetween. In the illustration of FIG. 14, the piston is fixed in the interior of the upper section 22. Details of a threaded connection between the legs 32 and the tubular center post 10 are illustrated in FIG. 15. In that embodiment, T-nuts or regular nuts may be positioned within a body of a piston section. The piston is then inserted into the tubular interior of the center post 10 for added support thereto and into a position in which the threaded interior of the nut aligns with apertures in the legs 32. The piston may be optionally glued into post's 10 interior. As shown, winged screws or bolts may then be inserted therein and tightened. As earlier described, the nuts are too big to exit through the apertures, and therefore a tightenable connection is provided at the base 30 the rack 02.

The foregoing detailed description is to be clearly understood as being given by way of illustration and example only, the spirit and scope of the present invention being limited solely by the appended claims.

What is claimed is:

1. A free standing athletic equipment rack, comprising:
   a single upright center post having:
   a top end,
   a bottom end,
   a substantially vertical centerline, and
   a length located along said centerline and measured between said top end and said bottom end;
   a base connected to said bottom end of said center post for maintaining said center post in an upright position;
   said upright center post having a substantially square cross-sectional shape wherein said upright center post is continuous across said cross-section and said top end of said upright center post is laterally unsupported;
   an equipment support assembly selectively positionable at any location along said center post's length;
   said equipment support assembly having a length and being substantially horizontally oriented;
   said equipment support assembly comprising:
   a first arm and a second arm, one arm opposite the other arm and each arm astride said center post at opposite sides of said center post,
   connection means between said first arm and said second arm for urging said arms toward one another and into frictional engagement with said center post positioned therebetween,
   restraining means for maintaining said equipment support assembly in substantially horizontal orientation, and
   carrying means for receiving an article of athletic equipment and securing the article therein.

2. The free standing athletic equipment rack as recited in claim 1, wherein said equipment support assembly further comprises:
   a distal end located away from said center post;
   a supported end connected to said center post in cantilever orientation thereto.

3. The free standing athletic equipment rack as recited in claim 1, wherein each arm further comprises:
   a distal end located away from said center post;
   a supported end located at said center post and adjacent thereto; and
   an interior face in abutting engagement with said center post.

4. The free standing athletic equipment rack as recited in claim 1, wherein said connection means further comprises:
   tightenable supports connected through apertures in said arms and spanning a distance between said arms.

5. The free standing athletic equipment rack as recited in claim 4, wherein said tightenable supports further comprise:
   dow rods connected between said arms;
   screws extending through said apertures and into ends of said dow rods; and
   knobs located exteriorly to said arms for advancing said screws into said dow rods thereby drawing said arms inwardly, one toward the other.

6. The free standing athletic equipment rack as recited in claim 5, wherein said restraining means comprises said apertures and said dow rods, that said apertures and said dow rods are vertically and horizontally offset from one another and positioned on opposite sides of said center post for abutting engagement therewith, thereby maintaining said equipment support assembly in a substantially horizontal orientation therewith.

7. The free standing athletic equipment rack as recited in claim 5, wherein said knobs have a minimum diameter of about one and one-half inch and a minimum thickness of about one-quarter inch.

8. The free standing athletic equipment rack as recited in claim 1, wherein said carrying means further comprises:
   aligned recesses in top surfaces of said arms;
   said recesses configured to mate with a supportable member of the article of athletic equipment; and
   said recesses located proximate to a distal end of said equipment support assembly away from said center post.

9. The free standing athletic equipment rack as recited in claim 8, wherein said aligned recesses have the shape of half circles for receiving the tubular frame of a bicycle.

10. The free standing athletic equipment rack as recited in claim 1, further comprising a plurality of equipment support assemblies mounted upon said center post and at least one equipment support assembly having a longitudinal length different from a longitudinal length of the other equipment support assemblies thereby allowing athletic equipment supported upon said rack to be staggered at various distances from said center post.

11. The free standing athletic equipment rack as recited in claim 10, wherein said plurality of equipment support assemblies are mounted upon said center post so that at least one of said equipment support assemblies extends away from said center post in a different direction from the other equipment support assemblies thereby allowing athletic equipment supported upon said rack to be positioned on variable sides of said center post.

12. The free standing athletic equipment rack as recited in claim 1, wherein said center post is cross-sectionally rectangular in shape thereby providing four exterior longitudinal sides.

13. The free standing athletic equipment rack as recited in claim 1, wherein said base further comprises at least three legs projecting outwardly away from said center post, each leg from a different exterior longitudinal side of said center post.

* * * * *